United States Patent [19]

Yoshida et al.

[11] 4,333,903

[45] Jun. 8, 1982

[54] ROW OF CONTINUOUS SLIDE FASTENER COUPLING ELEMENTS AND METHOD OF MAKING THE SAME

[75] Inventors: Hiroshi Yoshida, Kurobe; Isao Hagiwara, Namerikawa; Shigeyuki Oodera, Kurobe, all of Japan

[73] Assignee: Yoshida Kogyo K.K., Tokyo, Japan

[21] Appl. No.: 8,102

[22] Filed: Jan. 31, 1979

[30] Foreign Application Priority Data

Jan. 31, 1978 [JP] Japan ................................. 53/9461

[51] Int. Cl.$^3$ ....................... A44B 19/12; B29C 25/00
[52] U.S. Cl. ........................... 264/165; 24/205.13 C;
264/346; 264/320; 264/285
[58] Field of Search ............... 24/205.13 C; 264/167,
264/235, 346, 320, 234, 237, 285, 165

[56] References Cited

U.S. PATENT DOCUMENTS

| | | | |
|---|---|---|---|
| 3,262,157 | 7/1966 | Fujisaki | 24/205.13 C X |
| 3,267,514 | 8/1966 | Porepp | 24/205.13 C X |
| 3,336,640 | 8/1967 | Chery | 24/205.13 C |
| 3,412,438 | 11/1968 | Sim | 24/205.13 C |
| 3,546,329 | 12/1970 | Hirono et al. | 264/235 |
| 3,555,135 | 1/1971 | Paul | 264/346 X |
| 3,730,817 | 5/1973 | Frolich | 156/580.2 |
| 3,855,671 | 12/1974 | Fujisaki | 24/205.13 C |

FOREIGN PATENT DOCUMENTS

| | | | |
|---|---|---|---|
| 49-23874 | 6/1974 | Japan. | |
| 1161016 | 8/1969 | United Kingdom | 24/205.13 C |

*Primary Examiner*—Roy D. Frazier
*Assistant Examiner*—Peter A. Aschenbrenner
*Attorney, Agent, or Firm*—Hill, Van Santen, Steadman, Chiara & Simpson

[57] ABSTRACT

A row of continuous slide fastener coupling elements is in the form of a filamentary coil or zigzag made of thermoplastic synthetic resin. Each coupling element includes a coupling head, a pair of legs extending from the coupling head, and a connector located remotely from the coupling head and extending between one of the legs and a leg of an adjacent coupling head. The connector is heat-set intensely by being heated concentratedly for increased dimensional stability. A method of manufacturing a row of such continuous slide fastener coupling elements includes the step of heating the connectors at a temperature close to the melting point of the monofilament.

7 Claims, 13 Drawing Figures

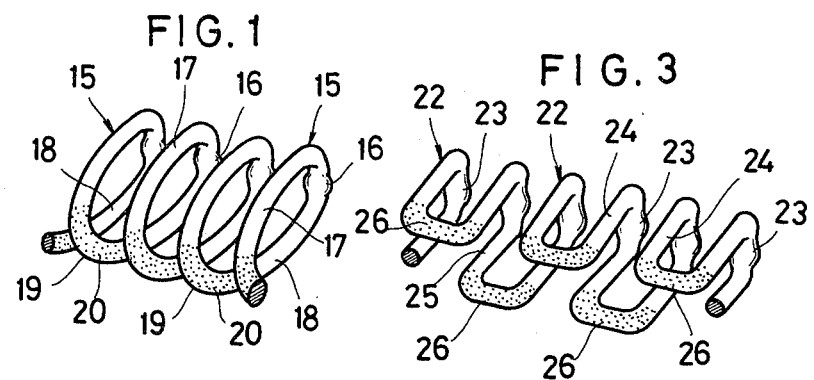

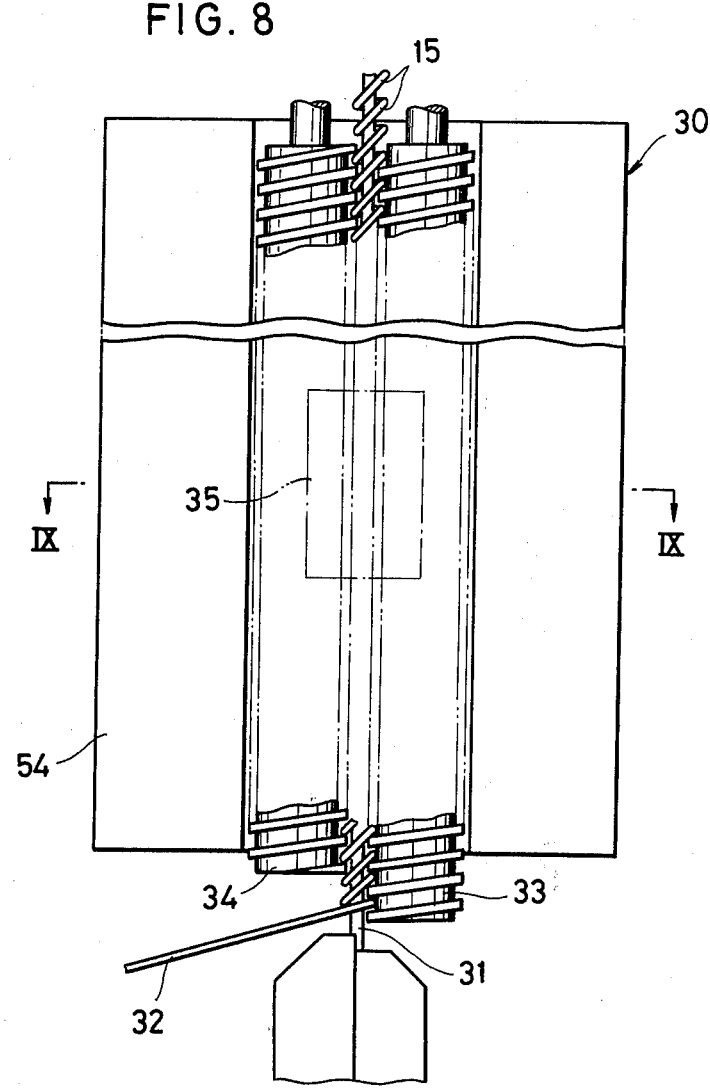

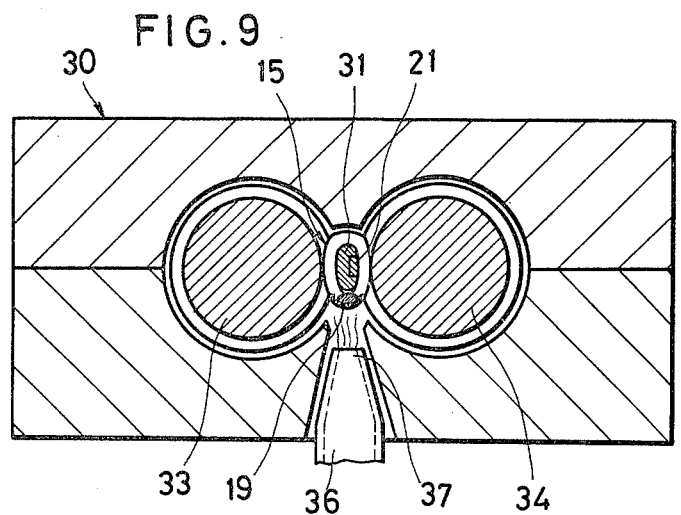
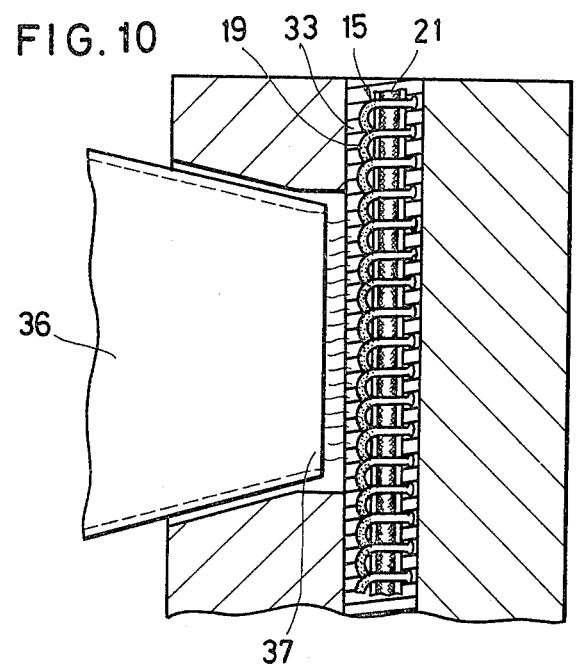

ROW OF CONTINUOUS SLIDE FASTENER COUPLING ELEMENTS AND METHOD OF MAKING THE SAME

BACKGROUND OF THE INVENTION

1. Field of the Invention

The present invention relates to a row of continuous slide fastener coupling elements in the form of a method of manufacturing a filamentary coil or zigzag made of thermoplastic synthetic resin.

2. Prior Art

As is well known in the art, a row of continuous slide fastener coupling elements is made by bending a monofilament of thermoplastic synthetic resin successively into a plurality of coils or turns each including a coupling head, a pair of spaced legs extending from the coupling head, and a connector located remotely from the coupling head and extending between one of the legs and a leg of an adjacent coil or turn. Since the monofilament is resilient, it is customary to heat-set the coiled or turned monofilament so as to relax internal stresses, so that the bent configuration may be maintained against further dimensional change. Such heat-setting has been performed bodily on the monofilament either by heating a die for forming the monofilament turns or coils or by moving the bent monofilament through a heated atmosphere.

It is generally known that a thermoplastic material can be well heat-set for increased dimensional stability by heating the material at a temperature close to its melting point. However, a coiled or otherwise bent monofilament cannot be heated to such a temperature because the monofilament, when thus heated, is liable to become deformed while it is withdrawn from the forming die. For this reason, the monofilament when it is shaped into coupling elements, is temporarily heat-set at a temperature well below the melting point so as to allow it to become sufficiently cooled with the coupling elements are issued out of the die. For such temporary heat-setting, the monofilament should be subjected to heat generally for 30 seconds during which molecules in the monofilament are stably rearranged due to Brownian movement. With this procedure, a zone for heat-setting must be lengthened for speeding up the element-forming operation, or the element-forming operation must be slowed down for making the element-forming device smaller in size. Further, such heat-setting procedure requires a great amount of thermal energy to be consumed for heating the formed coupling elements wholly and for forcibly cooling them down.

A pair of rows of coupling elements thus heat-set at a relatively low temperature are interlocked and attached to a pair of slide fastener stringer tapes, which then are dyed. The rows of interengaged coupling elements, or a chain of coupling elements, are finally heat-set during such a dyeing process. For example, the stringer tapes made of cotton or Nylon 66 are normally dyed in a coloring agent heated to a temperature of about 95° C. that is considered to be equivalent to a temperature of 145° C. in atmosphere, which is substantially equal to or below a temperature (about 140° C.-150° C.) at which the coupling element rows have been heat-set. However, with the stringer tapes being made of polyester, they should be dyed at a temperature of about from 130° C. to 140° C., the atmospheric equivalent of which exceeds the temperature of heat-setting of the coupling elements. This usage has led to a drawback in that the coupling elements tend to become deformed, resulting in disturbances in element-to-element distance or pitch, twists in the rows of coupling elements, or variations in the height or thickness of the coupling elements. Accordingly, to minimize the above difficulties, care should be exercised as to selection of the temperature at which the coupling elements are to be heat-set, the material of the monofilament, or the properties thereof, such as the rate of water absorption or shrinkage.

With the foregoing disadvantages in view, it has been attempted to apply ultrasonic energy wholly to the monofilament being shaped within a relatively short period of time, such heat-setting being performed at a temperature below and close to the melting point of the monofilament. With such ultrasonic heat-setting, however, a great amount of energy must be consumed, and an expensive ultrasonic oscillator that necessitates a high degree of precision is required, making the formed coupling elements more costly.

SUMMARY OF THE INVENTION

According to the present invention, each of continuous slide fastener coupling elements of a monofilament made of thermoplastic synthetic resin has a connector located remotely from a coupling head of the coupling element and extending between one of a pair of legs of the coupling element and a leg of an adjacent coupling element. The connector includes a portion which has been heat-set intensely at a temperature close to the melting point of the monofilament. The connector of each coupling element is heated for a short period of time such as 1 or 2 seconds so as to be heat-set for increased dimensional stability.

An object of the present invention is to provide a method of making a row of continuous slide fastener coupling elements having an element-to-element distance or pitch that is stabilized easily, reliably and less costly.

Still another object of the present invention is to provide a method of manufacturing a row of continuous slide fastener coupling elements at a low cost.

A further object of the present invention relates to a method of manufacturing a row of continuous slide fastener coupling elements with less heat energy required for fixing an element-to-element distance or pitch.

A still further object of the present invention is to provide a method of manufacturing a row of continuous slide fastener coupling elements easily at an increased rate of production.

Many other advantages, features and additional objects of the present invention will become manifest to those versed in the art upon making reference to the detailed description and the accompanying drawings in which preferred embodiments incorporating the present invention are shown by way of example.

BRIEF DESCRIPTION OF THE DRAWINGS

FIGS. 1 through 3 are fragmentary perspective views of rows of continuous slide fastener coupling elements constructed in accordance with the present invention;

FIG. 4 is a fragmentary front elevational view of the row of coupling elements shown in FIG. 1;

FIG. 5 is an enlarged cross-sectional view taken along line V—V of FIG. 4;

FIG. 6 is a view similar to FIG. 5, showing a modification;

FIG. 7 is a fragmentary plan view of a slide fastener stringer including a row of coupling elements according to the invention;

FIG. 8 is a front elevational view illustrative of the way in which a row of helically coiled coupling elements is successively formed by a pair of screw-like feeders;

FIG. 9 is a cross-sectional view taken along line IX—IX of FIG. 8;

FIG. 10 is a cross-sectional view illustrating the way in which the connectors of coupling elements are heated;

DETAILED DESCRIPTION

Figure 11:
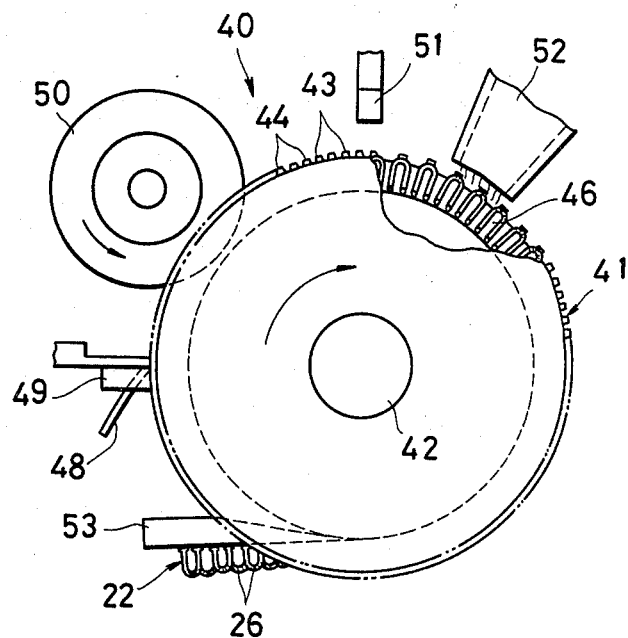
FIG. 11 is a front elevational view illustrative of the way in which a row of zigzag coupling elements is successively formed by a die wheel.

As shown in FIG. 1, a row of continuous slide fastener coupling elements 15 is in the form of a filamentary coil made of thermoplastic synthetic resin. Each coupling element 15 comprises a flattened and widened coupling head 16, a pair of spaced upper and lower legs 17,18 extending away from the coupling head 16, and a connector 19 located remotely from the coupling head 16 and extending between an upper one of the legs 17 and a lower leg 18 of an adjacent coupling element 15. Each connector 19 has a stable surface layer 20 (shown by transverse cross-sectioning in FIG. 5) that has been heat-set for dimensional stability by heating a surface of the connector facing away from the coupling head 16 at a temperature close to the melting point of the monofilament. The connector 19 thus resists further dimensional change when subject to forces, and will not be substantially deformed when heated during a stringer dyeing process at a later time. As shown in FIG. 6, the connector 19 may be bodily heat-set for increased dimensional stability. Further, as shown by stippling, the connector 19 may be intensely heated until it will have a roughened surface or will become opaque.

Since an element-to-element distance or pitch is determined by fixing the shape of only the connectors 19 of the coupling elements 15, the coupling heads 16 and the legs 17,18 are heat-set only temporarily at a relatively low temperature during a process of forming the row of coupling elements 15. Accordingly, the row of coupling elements 15 with only the connectors 19 intensely heat-set can be sewn to or woven into a slide fastener stringer tape.

In FIG. 2, the row of coupling elements 15 includes an elongate core 21 extending longitudinally therethrough and disposed between the upper and lower legs 17,18 and against the connectors 19, the core 21 being composed of stranded yarns or bonded slivers of thermoplastic synthetic fiber.

FIG. 3 illustrates a row of continuous slide fastener coupling elements 22 of a filamentary zigzag made of thermoplastic synthetic resin, each of the elements 22 comprising a coupling head 23, a pair of upper and lower legs 24,25 extending from the coupling head 23, and a connector 26 located remotely from the coupling head 23 and extending between one of the legs 24 or 25 and a leg 24 or 25 of an adjacent coupling element 22. The connectors 26 are similarly heat-set bodily or only at surface layers facing away from the coupling heads 23.

The row of coupling elements 15 shown in FIG. 1 is sewn to a slide fastener stringer tape 27 along its one longitudinal edge by means of threads 28, as shown in FIG. 7. The connectors 19 when their surfaces are roughened, act to prevent the threads 28 from shifting, and when they are opaque, are compatible to being dyed with the tape 27.

The row of helically coiled coupling elements 15 is formed by a device 30 as shown in FIGS. 8 and 9, the device 30 comprising a vertically movable mandrel 31 for coiling therearound a monofilament 32 of thermoplastic synthetic resin. The coiled monofilament 32 on the mandrel 31 is transported along and at the same time shaped by a pair of screw-like feeders 33,34 as they revolve about their axes, the feeders 33,34 being disposed one on each side of the mandrel 31 in a holder 54 and extending parallel thereto. The monofilament 32 while it is being coiled is heated at a relatively low temperature so as to be heat-set temporarily but not finally. Such temporary heat-setting is performed by heating the holder 54.

The connectors 19 of the coupling elements 15 are heated at a region 35 (FIG. 8) in the device 30, where there is disposed a nozzle 36 (FIGS. 9 and 10) for blowing hot air concentratedly to the connectors 19, which then are heated up to a temperature close to the melting point of the monofilament 32 for a short period of time such as 1 or 2 seconds. The connectors 19 are thus intensely heat-set and will not be deformed by heat during a fastener stringer dyeing process at a later time. Assuming that the monofilament 32 is made of Nylon 66, since its melting point is a temperature of about 250° C., the monofilament 32 may be heated at a temperature of about 210° C. to 260° C. for 1 or 2 seconds. The nozzle 36 has a contracted mouth 37 that faces toward and is located closely to the mandrel 31. With such an arrangement, only the connectors 19 of the coupling elements 15 are concentratedly heated, and the coupling heads 16 and the legs 17,18 are not subjected to intense heat. The coiled monofilament 32 is progressively cooled as it is fed out of the region 30 by the feeders 33,34, without having to be forcibly cooled by air. The connectors 19 of the coupling elements 15 may be heated by other suitable means such as an infrared radiator for inducing heat within the connectors 19. The coupling heads 16 and the upper and lower legs 17,18 will be heat-set when they are put in a heated coloring agent during a fastener stringer dyeing process.

As shown in FIG. 9, the mandrel 31 is longitudinally recessed for receiving therein the elongated core 21, which is inserted through the row of coupling elements 15 while the monofilament 32 is being coiled around the mandrel 31. Since the core 21 is disposed in the recess in the mandrel 31, the core 21 is not exposed directly to the flow of hot air from the nozzle 36, and thus is not intensely heat-set thereby. Accordingly, the core 21 as it is disposed in the row of coupling elements 15 retains a suitable degree of flexibility, a requirement necessary for a row of filamentary coupling elements. Such flexibility of the core 21 would be maintained, though somewhat less in degree, even if the mandrel 31 were omitted and the monofilament 32 were coiled directly around the core 21, because the connectors 19 themselves would serve to protect portions of the core 21 from direct exposure to hot air.

The connectors 19 of the coupling elements 15 are resistant to deformation due to heat when dyed, with the result that a slide fastener stringer with such row of coupling elements 15 is prevented from being twisted. Therefore, such slide fastener stringer can be sewn to a garment easily at a high speed.

Figure 13:
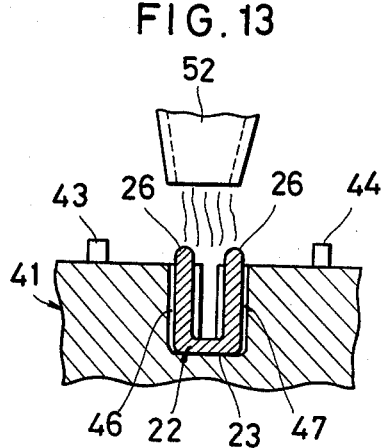
FIG. 13 is a fragmentary cross-sectional view taken along line XIII—XIII of FIG. 12.
Figure 12:
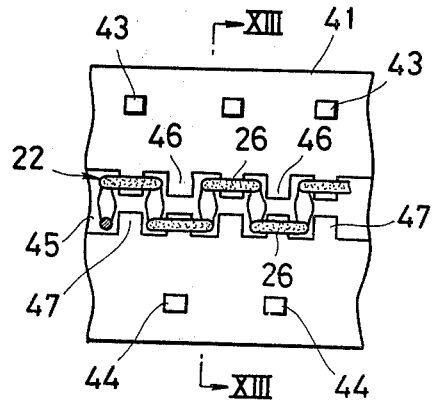
FIG. 12 is a fragmentary plan view of a peripheral portion of the die wheel shown in FIG. 11.

The row of continuous slide fastener coupling elements 22 shown in FIG. 3 is manufactured by a device 40 shown in FIGS. 11 through 13. The device 40 comprises a die wheel 41 rotatable on an axle 42 and having on its circumferential surface a pair of series of opposed projections 43,44 staggered from one another in the axial direction of the die wheel 41, as best shown in FIG. 12. The die wheel 41 has a peripheral groove 45 disposed between the pair of series of projections 43,44, there being a plurality of pairs of teeth 46,47 confronting each other and extending into the groove 45. A monofilament 48 of thermoplastic synthetic resin is supplied by a feeder 49 onto the circumferential surface of the die wheel 41 while the wheel is being rotated where the monofilament 48 is turned successively around the projections 43,44 across the groove 45 so as to be patterned in a zigzag shape. The monofilament 48 thus arranged on the die wheel 41 is pushed by a bending roll 50 into the groove 45, whereupon the monofilament 48 is forced out of engagement with the projections 43,44 into the groove 45 with portions of the monofilament 48 placed on the teeth 46,47, said monofilament portions acting as the connectors 26 of the coupling elements 22. A punch 51 moves toward and away from the die wheel 41 and stamps portions of the monofilament 48 which extend across the groove 45 against the bottom of the groove 45 so as to form them into the coupling heads 23. The connectors 26 on the teeth 46,47 are intensely heat-set by being heated by hot air supplied from a nozzle 52. The monofilament 48 is thus formed into the coupling elements 22, which are then removed successively from the die wheel 41 by a scraper 53.

The method of the present invention can be carried out with less energy and hence less cost because only the connectors of the coupling elements are heated intensely for stable heat-setting.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A method of manufacturing a row of continuous slide fastener coupling elements, comprising the steps of:
   (a) transporting and bending a monolfilament of thermosplastic synthetic resin successively into a plurality of continuous turns each including a coupling head, a pair of spaced legs extending from said coupling head, and a connector located remotely from said coupling head and extending between one of said legs and a leg of an adjacent coupling element; and
   (b) substantially during said bending, permanently heat-setting only each said connector at least at a surface layer thereof which faces away from said coupling head at a temperature slightly below the melting point of the monofilament, and while said turns are still being transported, providing said turns a temporary heat-set at a relatively low temperature, whereby the temporarily heat-set coupling heads are stabilized in pitch by the permanently heat-set connectors.

2. A method according to claim 1, said heat-setting of said connector being accomplished by application of a heated medium to each said connector.

3. A method according to claim 2, said heated medium being hot air.

4. A method according to claim 1, further including the step of inserting an elongate thermoplastic core through the row of the coupling elements simultaneously with the monofilament bending step.

5. A method according to claim 1, said heat-setting of said connector also roughening said surface layer.

6. A method according to claim 1, said heat-setting of said connector also roughening the entire body of the connector.

7. A method according to claim 1, said heat-setting of said connector extending throughout the entire body of said connector.

* * * * *